Figure 1:
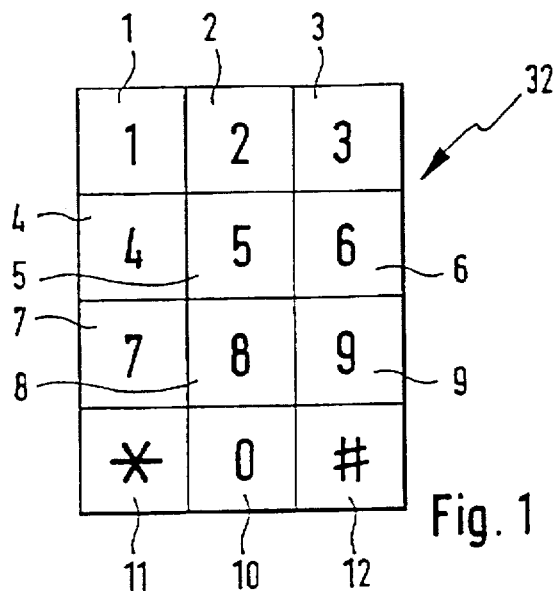

United States Patent [19]
Siegle

[11] Patent Number: 5,748,115
[45] Date of Patent: May 5, 1998

[54] METHOD OF INPUTTING DIRECTIONAL INFORMATION

[75] Inventor: Gert Siegle, Berlin, Germany

[73] Assignee: Robert Bosch GmbH, Stuttgart, Germany

[21] Appl. No.: 793,821

[22] PCT Filed: Aug. 3, 1995

[86] PCT No.: PCT/DE95/01009

§ 371 Date: Feb. 14, 1997

§ 102(e) Date: Feb. 14, 1997

[87] PCT Pub. No.: WO96/05481

PCT Pub. Date: Feb. 22, 1996

[30] Foreign Application Priority Data

Aug. 16, 1994 [DE] Germany .......... 44 28 928.6

[51] Int. Cl.[6] .......... H03K 17/94; H03M 11/00
[52] U.S. Cl. .......... 341/22; 341/20; 341/23; 340/905; 340/990; 455/345; 700/207; 700/211
[58] Field of Search .......... 455/345, 375; 341/22, 20, 23; 345/133, 168; 364/444.2, 449.95, 424.029–424.033; 340/905, 988, 990, 995

[56] References Cited

U.S. PATENT DOCUMENTS

| | | | |
|---|---|---|---|
| 4,442,432 | 4/1984 | Quigley | 343/393 |
| 5,438,687 | 8/1995 | Suchowerskyj et al. | 455/345 |
| 5,546,310 | 8/1996 | Ehdaie et al. | 364/449 |

FOREIGN PATENT DOCUMENTS

4230912A1  8/1993  Germany .

*Primary Examiner*—Jeffery Hofsass
*Assistant Examiner*—Timothy Edwards, Jr.
*Attorney, Agent, or Firm*—Michael J. Striker

[57] ABSTRACT

A method is proposed that is used to input directional information into a radio unit or into a navigation unit with a calculation apparatus, by means of a numerical keypad. With the method, cardinal points are allocated to the externally located keys of the numerical keypad. Directional information is input by actuating the corresponding keys.

6 Claims, 1 Drawing Sheet

METHOD OF INPUTTING DIRECTIONAL INFORMATION

RELATED ART

The invention proceeds from a method according to the preamble of the main claim. A method in which city names are entered by means of a numerical keypad into a radio unit having a calculation unit and memory, is known from Unexamined Patent Application DE-OS 42 30 912.3-53. In this, multiple letters are allocated to each key of the numerical keypad, which is connected to the calculation unit with memory. A directional input is entered by entering a location and a destination with names. Since the input can be ambiguous, the calculation unit searches in the memory for the possible cities and outputs them for further selection.

ADVANTAGES OF THE INVENTION

The method according to the invention with the features of the main claim has, in contrast, the advantage that cardinal points are allocated to the keys of a numerical keypad, and that directional information can be entered by actuating the corresponding keys. Thus no additional input unit is required. The configuration of the numerical keypad offers the advantage that the cardinal points can be allocated to the keys of the numerical keypad in a manner corresponding to a map. This makes possible a simple input method which is easy to understand because of the analogy with the use of cardinal points on maps.

The features set forth in the subclaims make possible advantageous developments and improvements of the method indicated in the main claim. It is particularly advantageous to actuate a special key in order to cause the location of the vehicle to be determined. The use of a special key allows easy operation of the input method.

A particular embodiment of the method is achieved by the fact that the cardinal points—north, east, south, and west—are allocated to the second key (2) of the first row, the third key (6) of the second row, the second key (8) of the third row, and the first key (4) of the second row of the numerical keypad, adjoining the (5) key. This allocation of the cardinal points by analogy with maps allows the driver to utilize the numerical keypad intuitively in order to input directional information, without needing to use a complex code.

The input of multiple defined ranges by actuating the corresponding key once or several times makes it possible to input more precise directional information in a simple fashion.

An advantageous gain in the precision of the input method is achieved by the fact that the directional data northwest, northeast, southeast, and southwest are allocated to the first and third keys (1, 3) of the first row and to the third and first keys (9, 7) of the third row of the numerical keypad. As a result, directional input can be made even more precisely. The assignment of the keys of the numerical keypad that is used corresponds to the directional indication on maps, and can therefore be used intuitively by the user.

A further advantageous embodiment of the method consists in using the second key (5) of the second row of the numerical keypad, to which the number 5 is assigned, as a special key, for example to determine location.

The second key (5) of the second row is thus perceived as the central key when the user makes inputs, and the allocation of the adjacent keys to the cardinal points is intuitively understood by the user.

DRAWINGS

An exemplified embodiment of the invention is depicted in the drawings and explained in the description below. In the drawings, FIG. 1 shows a numerical keypad, FIG. 3 a sequence diagram of the method, FIG. 2 a receiving unit, FIG. 4 a directional fan, and FIG. 5 directional circles.

DESCRIPTION OF THE EXEMPLIFIED EMBODIMENT

Shown in FIG. 1 is a numerical keypad 32 as is commonly used in radio units, telephones, and navigational units. Numerical keypad 32 is divided into four rows and three columns. The first key 1 of the first row is assigned the digit 1, the second key 2 of the first row the digit 2, and the third key 3 the digit 3. The first key 4 of the second row is assigned the digit 4, the second key 5 of the second row the digit 5, and the third key 6 of the second row the digit 6. The first key 7 of the third row is assigned the digit 7, the second key 8 of the third row the digit 8, and the third key 9 of the third row the digit 9. The first key 11 of the fourth row is assigned the special symbol X [sic], the second key 10 of the fourth row the digit 0, and the third key 12 of the fourth row the special symbol "pound."

Figure 2:
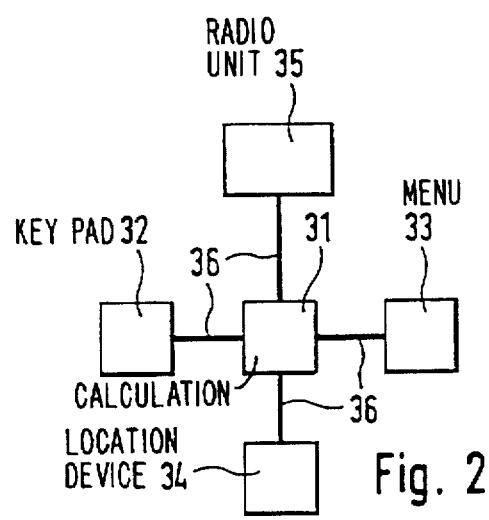

FIG. 2 shows a radio unit 35 that is connected to a calculation apparatus 31 via data lines 36. Calculation apparatus 31 is connected via data lines 36 to numerical keypad 32, to memory 33, and to a location determination device 34.

Figure 3:
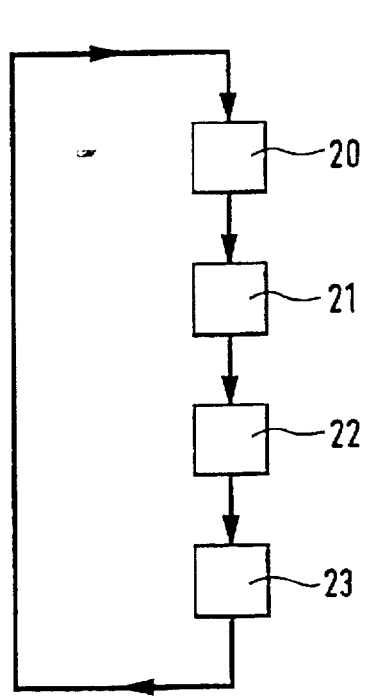

FIG. 3 shows a simple sequence diagram of a program for operating the radio unit. At program point 20, calculation apparatus 31 is waiting for an input. When input occurs from the special key which indicates the beginning of a directional indication, the program branches to point 21. At program point 21, calculation apparatus 31 is waiting for the input of directional information by actuation of one of the keys of numerical keypad 32. The directional information allocated to the keys, and the functions allocated to the special keys, are stored in memory 33. Also stored in memory 33 are the distance radii for single and multiple actuations of the keys and for the size of location region 37, and the angular regions of the directional fan. After input from a special key, the program jumps to program point 22 at which, in the exemplified embodiment selected, traffic advisories are selected based on the directional regions entered, and are output at program point 23. Lastly the program jumps back to program point 20 and waits for further inputs.

Figure 4:
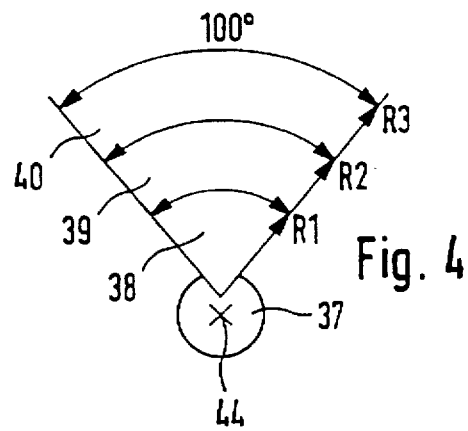

FIG. 4 shows a directional fan with a 100-degree angular opening. Three angular ranges 38, 39, 40 having distance radii $R_1$, $R_2$, $R_3$, which are selected by actuating the corresponding key once or several times, are indicated. A cross marks the current location 44. Also indicated is a location region 37, which always belongs to the selected directional region.

Figure 5:
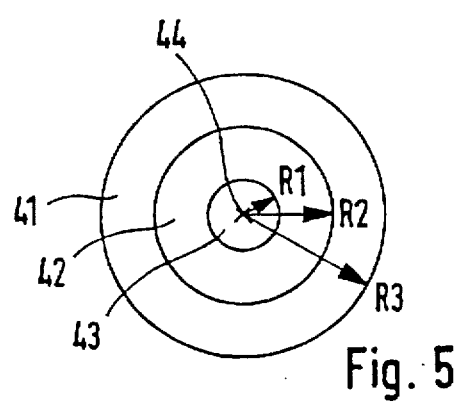

FIG. 5 shows a plurality of circular regions 43, 42, 41 having different radii $R_1$, $R_2$, $R_3$, which are determined by correspondingly actuating the corresponding special key once or several times.

The description of a specific exemplified embodiment is described with reference to FIGS. 1, 2, 3, 4, and 5.

The program sequence depicted in FIG. 2 is stored in memory 33. The allocation of keys 1, 2, 3, 4, 6, 7, 8, 9 of numerical keypad 32 to the cardinal points, and the allocation of second key 5 of the second row and special keys 10, 11, 12 of the fourth row, labeled 0, X, and "pound," to which special functions are assigned in this exemplified embodiment, are also stored in memory 33.

In the following exemplified embodiment, the function allocated to special key 11 is that the beginning of a directional input is indicated to calculation apparatus 31 upon actuation of special key 11. Upon actuation of second key 5 of the second row, calculation apparatus 31 performs a location determination using location determination device 34. The function allocated to "pound" key 12 is that of informing calculation apparatus 31 of the completion of a directional input. The person skilled in the art can, however, also select a different assignment of special functions to second key 5 of the second row and to keys 1, 11, 12 of the fourth row.

It is advantageous in the case of receivers having a Traffic Message Channel (TMC), for example, to assign to the TMC key the function of indicating to calculation apparatus 31 the beginning of a directional input.

Two different directional regions can be input: directional fans, and directional circles. Actuation of directional keys 1, 2, 3, 4, 6, 7, 8, 9, i.e. the keys of numerical keypad 31 to which directions are allocated, defines directional fans 38, 39, 40 which have a defined angular opening of, for example, 100 degrees. The direction of the angular fan is defined by selection of the corresponding key. For example, actuation of second key 2 of the first row, to which the direction "north" is allocated in memory 33, defines a directional fan, proceeding from the current location 44, which is open symmetrically toward the north and contains location region 37, as depicted in FIG. 4.

For example, actuation of third key 3 of the first row, to which the direction "northeast" is allocated, defines a directional fan with a defined angular opening proceeding symmetrically toward the northeast from location 44. The angular openings are preferably between 90 and 120 degrees.

The circular regions are entered by means of a special key, in this exemplified embodiment by means of second key 10 of the third [sic] row, to which the digit 0 is assigned. Actuation of second key 10 of the third [sic] row defines a circular region around location 44. The radius of the circular region is entered by actuating second key 10 of the fourth row once or several times.

Input of directional information using numerical keypad 32 is accomplished as follows: the radii for circular regions 41, 42, 43 and for directional fans 38, 39, 40, and the size of the angular openings of directional fans 38, 39, 40, are stored in memory 33.

In this exemplified embodiment, a distance radius of 10 kilometers is allocated to a single actuation of a key, a distance radius of 50 kilometers to two actuations of a key, and a distance radius of 100 kilometers to three actuations of a key. The function allocated to second key 10 of the fourth row is that of defining a circular region as the directional indication. Actuating second key 10 of the fourth row once or several times selects correspondingly defined circular radii. In this exemplified embodiment, the radii for the circular regions are selected in accordance with the radii for the directional fans. The function allocated to second key 5 of the second row is that of causing calculating apparatus 31 to perform a location determination and store the new location 44 in memory 33.

Location determination is performed by means of a location determination device 34, e.g. by means of a navigation system or an identification of the transmitter that is to be received, as described by H. Kässer in "Transmitter identification in Autoradio Berlin" [Senderidentifikation im Autoradio Berlin], Bosch Technische Berichte, Vol. 8, 1986, page 90.

A circular region is entered by first actuating first special key 11 of the fourth row, which informs calculation apparatus 31 that a directional input follows. Actuation of second key 5 of the second row then causes a location determination; second key 10 of the fourth row is then actuated once or several times, depending on how large the radius of the circular region is to be. Input is concluded using third special key 12 of the fourth row, which informs calculation apparatus 31 that input is complete.

The directional information "north, range up to 100 kilometers" is entered by actuating first special key 11 of the fourth row, then second key 5 of the second row, and then, three times, second key 2 of the first row; and, to conclude input, third special key 12 of the fourth row.

If the directional information "southwest with a range of 10 kilometers" is to be input, one actuates first special key 11, then second key 5 of the second row, and then, once, first key 7 of the third row; and to conclude, third special key 12.

The directional information "west, range up to 500 kilometers" is entered by actuating first special key 11, then second key 5 of the second row for location determination, then, four times, third key 6 of the second row; and to conclude, third special key 12.

This method can be used in general for the input of directional information, and applied in particular for the selection of travel notices. When traffic advisories are transferred using the Radio Data System (RDS), the received data contain not only the traffic advisories but also the location affected by the traffic advisory, as described by Brägas, Busch, and Markus in "Transmission of coded traffic advisories . . . " [Übertragung von codierten Verkehrshinweisen . . . ], Bosch Technische Berichte, Vol. 8, No. ½, 1986, pages 15 ff.

Entering the corresponding circular region or the directional fan causes calculation apparatus to select the incoming travel notices in terms of whether the notice is located in the directional region that was entered. After selection of the traffic advisories, only those traffic advisories which are located in the selected directional region are output.

Selection of a traffic notice by means of a directional input is explained with reference to FIG. 2.

At program point 20, calculation unit 31 is waiting for an input. After input of first special key 11, the program jumps to program point 21 and calculation unit 31 waits for a directional input. Upon actuation of a key, calculation apparatus 31 determines the directional region that is stored in memory 33 for the key that was actuated. Input of a further special key informs calculation apparatus 31 that the input process is complete.

Calculation apparatus 31 then, at program point 22 in the selected exemplified embodiment, selects the traffic advisories that are located in the selected directional regions and outputs them, at program point 23, to the driver via a visual or audible display. The program then branches back to point 20.

I claim:

1. A method of inputting directional information into a radio unit (35) and/or navigation unit having a calculation apparatus (31) that is connected to a memory (33) and to a numerical keypad (32) that is made up of four rows of keys, arranged one above another in the form of a rectangle, with three keys each, characterized in that cardinal points are allocated to the keys (1, 2, 3) of the first row and the first (4) and last key (6) of the second row and the keys (7, 8, 9) of the third row of the numerical keypad (32); and that special functions are allocated to the keys (11, 10, 12) of the fourth row and to the second key (5) of the second row; and that after actuation of a special key of the numerical keypad (32), directional information is entered by actuating a key (1, 2, 3, 4, 6, 7, 8, 9), and the input of directional information is terminated by actuating a special key.

2. The method as defined in claim 1, characterized in that the location of a radio unit (35) is determined prior to the input of directional information, by actuating a special key, by a location determination device (34) using a navigation system or by means of transmitter identification.

3. The method as defined in claim 1, characterized in that the directional information is input with a first defined range for the "north" direction by actuating the second key (2) of the first row once, for the "west" direction by actuating the first key (4) of the second row once, for the "south" direction by actuating the second key (8) of the third row once, and for the "east" direction by actuating the third key (6) of the second row once; and that input is concluded by actuating a special key.

4. The method as defined in claim 1, characterized in that the directional information "northwest," "southwest," "southeast," and "northeast" is input by actuating the third key (3) of the first row for "northeast," the third key (9) of the third row for "southeast," the first key (7) of the third row for "southwest," and the first key (1) of the first row for "northwest," and as conclusion of the input, a defined special key is actuated.

5. The method as defined in claim 1, characterized in that the directional information for a second or a third defined range is input by first performing a special key for location determination and then a multiple actuation of the corresponding directional key; and to conclude the input, a special key is pressed.

6. The method as defined in claim 1, characterized in that the second key (5) of the third row of the numerical keypad (32) is used as a special key, the actuation of which causes a location determination.

* * * * *